United States Patent [19]

Orsic

[11] Patent Number: 4,817,082
[45] Date of Patent: Mar. 28, 1989

[54] CROSSPOINT SWITCHING SYSTEM USING CONTROL RINGS WITH FAST TOKEN CIRCULATION

[75] Inventor: Milo Orsic, Lincolnwood, Ill.

[73] Assignee: American Telephone and Telegraph Company, AT&T Bell Laboratories, Murray Hill, N.J.

[21] Appl. No.: 23,722

[22] Filed: Mar. 9, 1987

[51] Int. Cl.$^4$ .................. H04Q 11/04; H04Q 3/00
[52] U.S. Cl. .................. 370/58; 340/825.05; 340/825.79; 340/825.85; 370/86
[58] Field of Search .................. 370/58, 60, 67, 86, 370/85, 89, 90, ; 340/825.8, 825.79, 825.85, 825.87, 825.05, 825.06, 825.5; 364/200

[56] References Cited

U.S. PATENT DOCUMENTS

| | | | |
|---|---|---|---|
| 3,141,067 | 7/1964 | Spandorfer | 340/825.85 |
| 3,165,719 | 1/1965 | Mueller | 340/825.87 |
| 3,534,331 | 10/1970 | Kautz | 340/825.87 |
| 4,281,381 | 7/1981 | Ahuja et al. | 364/200 |
| 4,331,956 | 5/1982 | Anderson | 370/67 |
| 4,417,245 | 11/1983 | Melas et al. | 340/825.8 |
| 4,454,508 | 6/1984 | Grow | 370/86 |
| 4,524,440 | 6/1985 | Orsic | 370/54 |
| 4,536,873 | 8/1985 | Leete | 370/85 |
| 4,539,678 | 9/1985 | Ambrobe et al. | 370/86 |
| 4,590,468 | 5/1986 | Steiglitz | 370/94 |
| 4,602,365 | 7/1986 | White et al. | 370/89 |
| 4,604,742 | 8/1986 | Hamada et al. | 370/89 |
| 4,609,920 | 9/1986 | Segarra | 370/85 |
| 4,683,564 | 7/1987 | Young et al. | 340/825.79 |
| 4,736,465 | 4/1988 | Bobey et al. | 340/825.05 |

OTHER PUBLICATIONS

1986 *IEEE Conference* CH12347-3/86/0000/0141, S. Nojima et al., "High-Speed Packet Switching Network for Multi-Media Information", pp. 141-150.

*Pathways to the Information Society*, proceedings of the Sixth International Conference on Computer Communication, London, 7-10, Sep., 1982, P. Willis, "An Implementation of a Token Ring", pp. 149-153.

*10th Conference on Local Computer Networks*, Oct. 7-9, 1985, IEEE, Y. Qu et al., "Paring: A Token Ring Local Area Network with Concurrency", pp. 108-113.

*IBM Technical Disclosure Bulletin*, vol. 24, No. 11A, Apr., 1982, P. Janson et al., "Ring Access Control to Bus Local Network", pp. 5325-5328.

*Primary Examiner*—Philip H. Leung
*Assistant Examiner*—Geoffrey S. Evans
*Attorney, Agent, or Firm*—Ross T. Watland

[57] ABSTRACT

A switching arrangement comprising a crossbar array of crosspoint elements where each column of crosspoint elements, is associated with its own control ring mechanism. The enabling of the individual crosspoint elements of a column and the subsequent transmission of packets are effected rapidly in response to a token, e.g., a single enable bit, that is circulated on the associated control ring.

14 Claims, 4 Drawing Sheets

| STATE | OUTPUT |
|---|---|
| S0 | R-LINE - LOW<br>T-LINE - IDLE |
| S1 | R-LINE - SEND DESTINATION ADDRESS AND STAY HIGH<br>T-LINE - IDLE |
| S2 | R-LINE - HIGH<br>T-LINE - TRANSFER PACKET |
| S3 | R-LINE - LOW<br>T-LINE - IDLE |

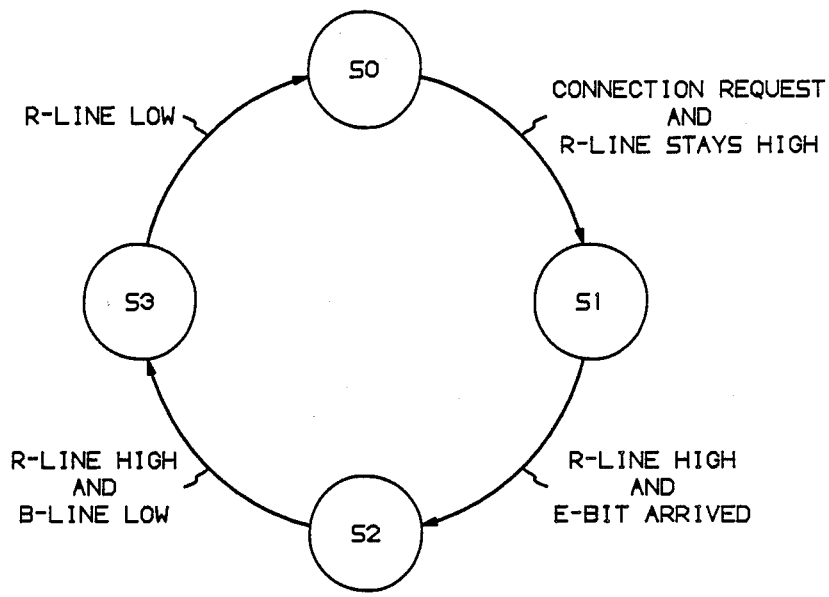

FIG. 5

| STATE | OUTPUT |
|---|---|
| S0 | MODE - 1<br>LINE 112 - LOW(DISCONNECTED)<br>G-LINE - LOW<br>B-LINE - LISTEN(NO SIGNAL APPLIED) |
| S1 | MODE - 2<br>LINE 112 - LOW(DISCONNECTED)<br>G-LINE - LOW<br>B-LINE - LISTEN(NO SIGNAL APPLIED) |
| S2 | MODE - 2<br>LINE 112 - LOW(DISCONNECTED)<br>G-LINE - LOW<br>B-LINE - LISTEN(NO SIGNAL APPLIED) |
| S3 | MODE - 1<br>LINE 112 - HIGH(CONNECTION)<br>G-LINE - HIGH<br>B-LINE - APPLY BUSY(HIGH) SIGNAL<br>GENERATE PULSE ON LINE 114<br>TO PASS ON E-BIT |

FIG. 6

CROSSPOINT SWITCHING SYSTEM USING CONTROL RINGS WITH FAST TOKEN CIRCULATION

BACKGROUND AND PROBLEM

The long circuit setup times associated with known telephone switching systems, e.g., crossbar systems, make such systems impractical for applications requiring frequent, short-duration, data communications. Circuits are typically established in such systems by a central control complex only after an available network path is found by hunting through a large centralized database. Not only is such a path hunt slow, but many additional communications are required both to request circuits and to keep the centralized database informed of every network status change.

One known approach to the problem of switching packetized information is disclosed in U.S. Pat. No. 4,524,440, issued to M. Orsic. The system is referred to as a fast circuit switching system, since a separate circuit is established for each packet-sized data communication. Information is conveyed from a number of communications modules in source channels to a number of port controllers and to a network. Information is conveyed from the network to the communications modules in destination channels. Each communications module includes a transmitter that transmits circuit setup request signals defining requested destination channels. Each port controller stores one of a number of status words defining both the availability of the destination channels and the availability of associated receivers included in the communications modules. Each of these status words is cycled to each port controller. When one of the status words cycled to a port controller defines that a requested destination channel and an associated communications module receiver are available, the port controller transmits a circuit setup request signal and subsequent data to the network. The network responds to the circuit setup request signal by establishing a circuit to the requested destination channel. The port controllers of the system use the cycled status words to advantage to control the transmission of packets by the communications modules. However, substantial circuit setup delays can occur because of the time required to cycle the status words to the port controllers. Such delays result in a significant waste of the available network bandwidth to the destinations. For example, when the status for a particular destination has just been cycled from a given port controller, the transmission of a packet to that destination is delayed until the status word is cycled through all other port controllers and returned again to the given port controller. The delay occurs even though none of the other communications modules are contending to transmit a packet to that destination. The status word cycle time also delays the updating of status words to reflect changes in receiver availability. Not only can this unnecessarily delay transmission of a packet to a receiver that has just become available, but it also means that a packet may be transmitted to an unavailable receiver before the status word is updated to reflect the unavailable status. In the latter case, the packet may be lost. In applications where reliable packet communication is required, relatively complex packet protocols and additional packet buffering are typically implemented to allow retransmission of lost packets.

In view of the foregoing, a recognized problem in the art is the delay in enabling packet transmission in known switching arrangements. Not only does the delay waste available system bandwidth, it may also necessitate the use of complex packet processing techniques to assure reliable communication.

Solution

The foregoing problem is solved and a technical advance is achieved in accordance with the principles of the invention in an exemplary switching arrangement comprising a crossbar array of crosspoint elements where each column of crosspoint elements is advantageously associated with its own control ring mechanism, and where the enabling of the individual crosspoint elements of a column and the subsequent transmission of packets are effected rapidly in response to a token, e.g., a single enable bit, that is circulated on the associated control ring. The control mechanism is efficient in enabling packet transmission without delay to avoid wasting system bandwidth and conducive to reliable communication without complex packet processing.

An arrangement in accordance with the invention is used for switching information from M input means to N output means. The arrangement includes an array of M×N crosspoint elements each associated with one of the input means and one of the output means. Each crosspoint element is responsive to a token for switching information from its associated input means to its associated output means. The arrangement further includes N control rings each associated with a different one of the output means for circulating a token among crosspoint elements associated with that output means.

In an illustrative embodiment of the invention, contention delays between packets are eliminated by passing the token during, rather than after, packet transmission. A single line is used to broadcast a busy signal defining the busy status of a network output simultaneously to all the crosspoint elements of the column rather than cycling such status information sequentially. The next contending crosspoint element is enabled and the transmission of the next packet to the output is effected only in the absence of the busy signal. The crosspoint elements are operative in two modes: a first mode where received tokens are passed on without being stored, and a second mode where received tokens are stored before being passed on. Only those crosspoint elements in a column that are contending to transmit packets operate in the second mode. Thus, the token effectively bypasses non-contending crosspoint elements, further enhancing the contention process.

DRAWING DESCRIPTIONS

Figure 2:
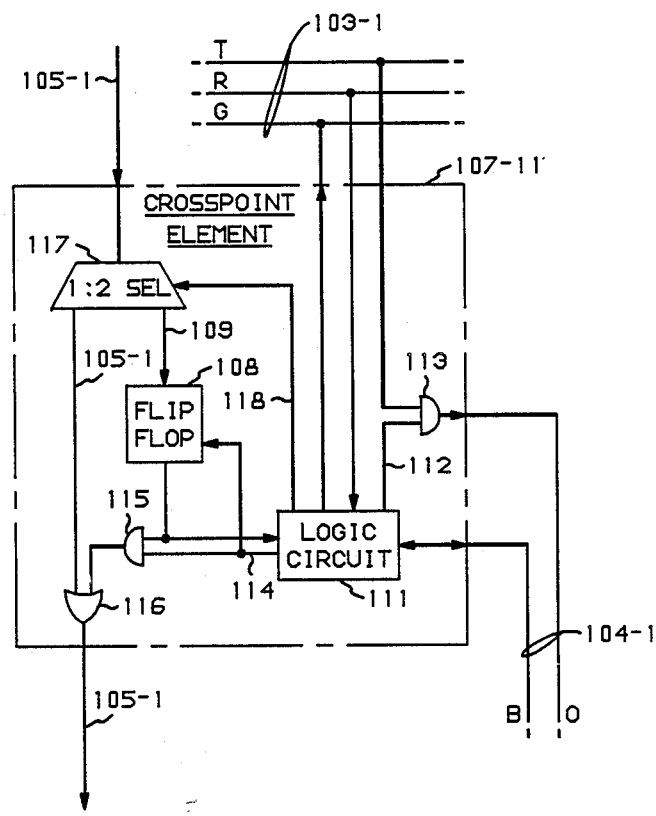
FIG. 2 is a circuit diagram of a crosspoint element in the system of FIG. 1.
Figures 3, 4:
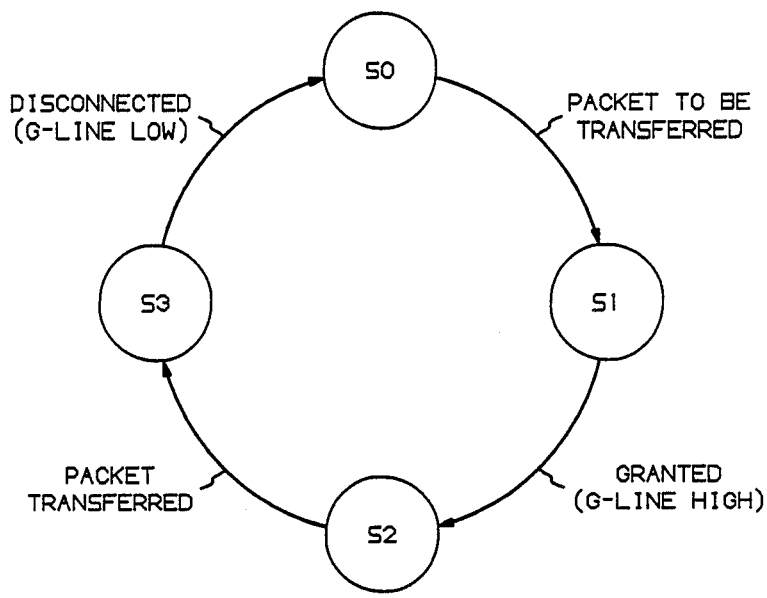
FIG. 3 is a state diagram for an input controller in the system of FIG. 1.

FIG. 4 lists the output definitions for each of the states in the state diagram of FIG. 3;

FIG. 5 is a state diagram for the crosspoint element of FIG. 2; and

FIG. 6 lists the output definitions for each of the states in the state diagram of FIG. 5.

DETAILED DESCRIPTION

Figure 1:
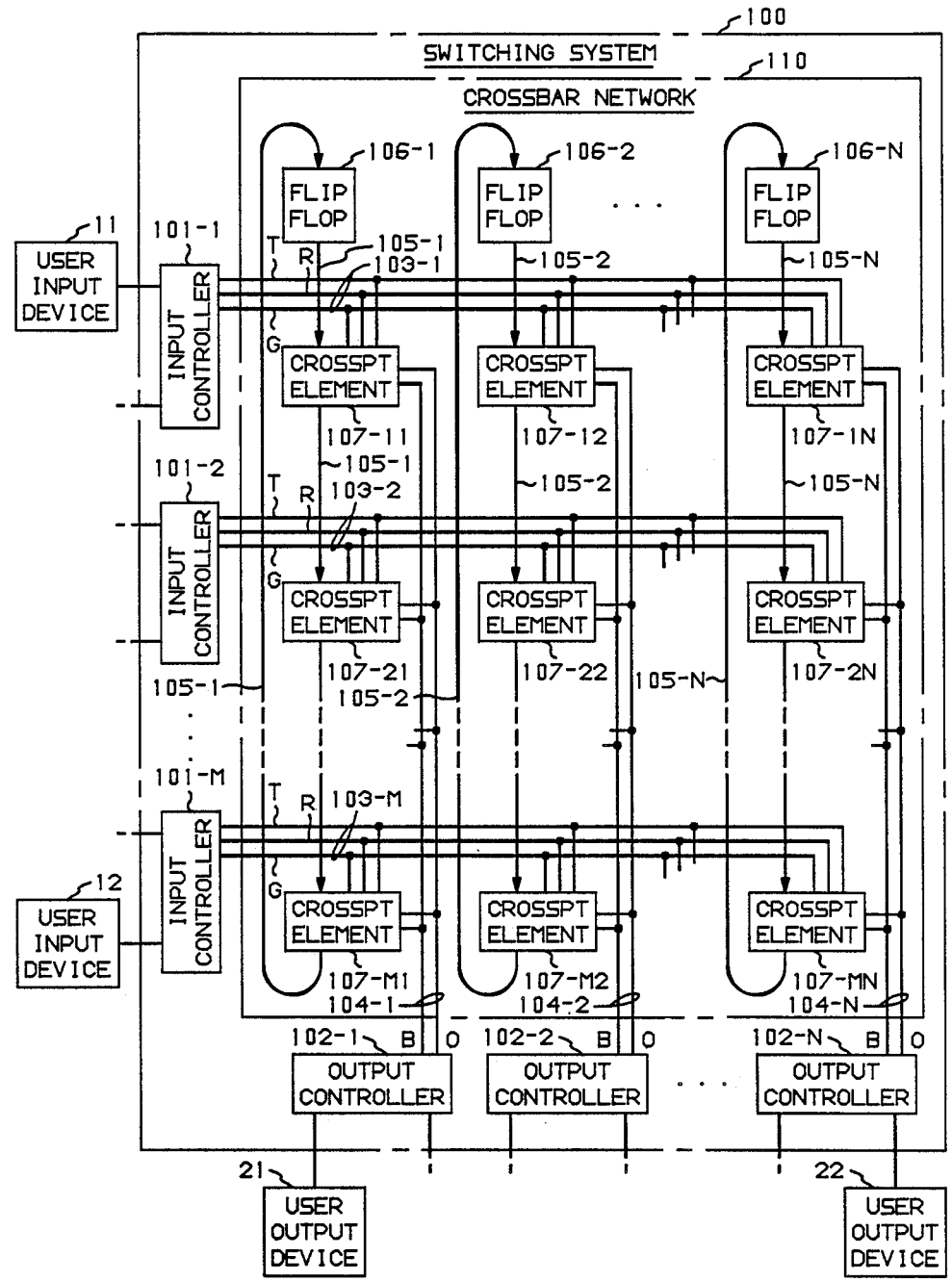
FIG. 1 is a block diagram of an exemplary switching system in accordance with the invention.

In FIG. 1, a switching system 100 switches information from a plurality of user input devices, 11 and 12, to a plurality of user output devices, 21 and 22. Such devices represent user terminal equipment including, for example, customer teleterminals, vendor databases, video transmitters and monitors, and packet access ports. Such equipment frequently comprises one user input device and one user output device for bidirectional communication. System 100 includes M input controllers 101-1 through 101-M, N output controllers 102-1 through 102-N, and a crossbar network 110. Network 110 includes an array of M x N crosspoint elements 107-11 through 107-MN arranged in M rows and N columns, where each row of crosspoint elements is associated with one input controller and each column of crosspoint elements is associated with one output controller. Each input controller has a three-conductor input bus which connects the input controller with its associated row of crosspoint elements. The input bus includes a transmit line (T-line), a request line (R-line) and a grant line (G-line). Input controller 101-1, for example, has input bus 103-1 connecting it with the row of crosspoint elements 107-11 through 107-1N. Each output controller has a two-conductor output bus which connects the output controller with its associated column of crosspoint elements. The output bus includes an output line (O-line) and a busy line (B-line). Output controller 102-1, for example, has output bus 104-1 connecting it with the column of crosspoint elements 107-11 through 107-M1. Associated with the N output controllers 102-1 through 102-N are N control rings 105-1 through 105-N. Each control ring is used for cycling a token, a single enable bit (E-bit), to the column of crosspoint elements associated with one output controller. Control ring 105-1, for example, is used for cycling an E-bit to the column of crosspoint elements associated with output controller 102-1. A bit-preserving flip-flop is interposed between the bottom and top crosspoint elements of each column to preserve the E-bit as described herein. Flip-flop 106-1, for example, is interposed between crosspoint elements 107-M1 and 107-11 of the first column.

Each input controller receives information from one or more user input devices. Similarly, each output controller transmits information to one or more user output devices. Information is transmitted through network 110 in packets. The transfer of a packet from input controller 101-1 to output controller 102-1 includes the following steps:

(1) Controller 101-1, upon determining that it has a packet to transmit to controller 102-1, transmits the address of controller 102-1 on the R-line of input bus 103-1. After the address has been transmitted, controller 101-1 waits for a grant signal (high) on the G-line of bus 103-1. While waiting, controller 101-1 keeps the R-line of bus 103-1 high.

(2) The address that has been transmitted simultaneously to all crosspoint elements in the row is recognized by the proper crosspoint element, 107-11 in the present example. Crosspoint element 107-11 secures access to the requested controller 102-1 through a contention scheme described herein. Crosspoint element 107-11 establishes a connection from the T-line of bus 103-1 to the O-line of output bus 104-1. Once the connection is established, crosspoint element 107-11 returns a grant signal on the G-line of bus 103-1 and marks the B-line of bus 104-1 busy by applying a high signal thereto.

(3) In response to the grant signal, controller 101-1 transmits the packet on the T-line of bus 103-1, via crosspoint element 107-11 and the O-line of bus 104-1, to controller 102-1. Once the transmission of the packet is completed, controller 101-1 requests a disconnection by applying a low signal on the R-line of bus 103-1. Crosspoint element 107-11 responds to the disconnection request by opening the connection. Crosspoint element 107-11 then applies a low signal to the G-line of bus 103-1 and to the B-line of bus 104-1 to indicate that the connection has been disconnected.

To resolve the contention among the crosspoint elements in a given column, a "bit passing" contention resolution mechanism is employed. A single E-bit circulates via a control ring through all the crosspoint elements of the given column. Only the crosspoint element that stores the E-bit is allowed to connect the T-line of the input bus to the O-line of the output bus. With respect to the E-bit, there are are two operational modes in which the crosspoint elements operate. In mode 1 ("bypassing mode"), a crosspoint element is not contending for the E-bit. When operating in mode 1, a crosspoint element effectively short circuits the input line of the control ring to the output line of the control ring thus allowing the E-bits to bypass the crosspoint element. However, when the crosspoint element operates in mode 2, it waits for the E-bit to arrive and stores the E-bit while it is establishing a connection.

One problem with bit passing mechanisms, in general, is bit propagation delay. For example, when a crosspoint element operates in a "bypassing" mode, the E-bit will still encounter at least one gate time delay as it is passed through that crosspoint element. This delay is cumulative. If the E-bit is stored by the active crosspoint element until the completion of the packet transfer (and subsequently passed to the next contending crosspoint element), a substantial cumulative delay could occur before the E-bit reaches the next contending crosspoint element. During this time the O-line is idle. Because of this delay problem, a substantial portion of the available network bandwidth may be wasted.

System 100 employs a different contention resolution scheme. In this scheme, an active crosspoint element passes the E-bit immediately after it has established the connection (and applied a high signal to the G-line of the input bus and to the B-line of the output bus). As a result, the contention resolution activity occurs contemporaneously with the packet transfer. The next crosspoint element to store the E-bit is the next one to access the output controller. However, access to the output controller is postponed until the B-line of the output bus indicates that the output controller is available to receive a packet. Since a signal on the B-line of the output bus is transmitted to all the crosspoint elements of a column simultaneously, the next packet transfer will take place immediately after the output controller becomes available.

A flip-flop is included at the top of each column to preserve the E-bit when none of the crosspoint elements in the column are contending for access to the output controller. The flip-flop also stores the E-bit when network 110 is reset or when a single column is reset. A column is reset when the E-bit of the column is lost due to a failure. A timing circuit (not shown) is used to to detect the loss of the E-bit. When the timing circuit determines that the E-bit has not appeared for a time period greater than the maximum circulation time of the control ring, the timing circuit operates to reset all the crosspoint elements of the column and to generate a new E-bit.

System 100 separates the control logic and control paths from the transmission paths. Accordingly, the packet transmission speed through network 110 can be substantially higher than the speed at which the control logic operates.

Input Controller 101-1

The state diagram for input controller 101-1 is shown in FIG. 3. The output definitions for each of the states are given in FIG. 4. When there are no packets to be transferred, controller 101-1 is in the "idle" state S0. When controller 101-1 has a packet to be transferred, it moves into the "request" state S1. In state S1, controller 101-1 transmits the address of the destination output controller on the R-line of input bus 103-1, and subsequently maintains that R-line at a high level. Controller 101-1 stays in state S1 until it receives a grant signal on the G-line of bus 103-1. The grant signal indicates to controller 101-1 that it is connected through to the destination output controller. In response to the grant signal, controller 101-1 moves into the "transfer" state S2 and transmits the packet on the T-line of bus 103-1. When controller 101-1 completes packet transmission, it moves into the "done" state S3. In state S3, controller 101-1 requests disconnection by removing the high signal from the R-line of bus 103-1. The appropriate crosspoint element disconnects the connection and then removes the grant signal from the G-line of bus 103-1. In response to removal of the grant signal, controller 103-1 moves back to the "idle" state S0.

Crosspoint Element 107-11

FIG. 2 is a more detailed diagram of crosspoint element 107-11. Recall that crosspoint element 107-11 operates in two modes—mode 1 and mode 2—with respect to the E-bit being circulated on control ring 105-1. Crosspoint element 107-11 operates in mode 1 to pass the E-bit received from flip-flop 106-1 on via a 1:2 selector 117 and an OR gate 116 to crosspoint element 107-21 without being stored in a flip-flop 108. Crosspoint element 107-11 is placed in mode 1 when a logic circuit 111 transmits a first signal via a line 118 to selector 117 such that selector 117 connects flip-flop 106-1 to OR gate 116. Crosspoint element 107-11 is placed in mode 2 when logic circuit 111 transmits a second signal via line 118 such that selector 117 connects flip-flop 106-1 to flip-flop 108 such that an E-bit received from flip-flop 106-1 is stored in flip-flop 108 before being passed on. To pass the E-bit on, logic circuit 111 generates a pulse on a line 114, which acts first to pass the E-bit from flip-flop 108 via an AND gate 115 and OR gate 116 to crosspoint element 107-21, and then to clear flip-flop 108.

Crosspoint element 107-11 establishes a connection from the T-line of input bus 103-1 to the O-line of output bus 104-1 when logic circuit 111 transmits a high signal via a line 112 to an AND gate 113 interposed between the T-line of bus 103-1 and the O-line of bus 104-1.

The state diagram for crosspoint element 107-11 is shown in FIG. 5. The output definitions for each of the states are given in FIG. 6. Beginning with an inactive state S0, crosspoint element 107-11 is operating in mode 1, line 112 is low such that there is no connection from the T-line of bus 103-1 to the O-line of bus 104-1, the G-line of bus 103-1 is low, and no signal is applied to the B-line of bus 104-1. When crosspoint element 107-11 detects a connection request on the R-line of bus 103-1, the address of its associated output controller 102-1 followed by a continued high signal, crosspoint element moves to state S1 and begins operating in mode 2. When an E-bit subsequently arrives, crosspoint element 107-11 stores the E-bit in flip-flop 108 and moves to state S2. As long as there is a busy (high) signal on the B-line of bus 104-1, indicating either that some other packet is presently being transmitted to controller 102-1 or that controller 102-1 is otherwise unavailable to receive a packet, crosspoint element 107-11 remains in state S2. When the busy signal is removed from the B-line of bus 104-1, crosspoint element 107-11 moves to state S3, establishes the connection from the T-line of bus 103-1 to the O-line of bus 104-1, transmits a grant (high) signal on the G-line of bus 103-1, transmits a busy (high) signal on the B-line of bus 104-1, passes the E-bit stored in flip-flop 108 on, and begins operating again in mode 1. Crosspoint element 107-11 remains in state S3 until its receives a disconnection request (the R-line of bus 103-1 goes low). Upon receiving the disconnection request, crosspoint element 107-11 moves back to state S0.

Output Controller 102-1

With respect to packet switching within system 100, output controller 102-1 provides only buffering facilities and flow control. The buffering of packets at controller 102-1 is effected when the transmission speed of network 110 is higher that the speed of the external transmission facilities. Controller 102-1 can stop the flow of packets to it, for example when its buffering facilities are full, by applying a busy signal on the B-line of bus 104-1.

What is claimed is:

1. An arrangement for switching information from M input means to N output means, M and N each being positive integers greater than one, said arrangement comprising
   an array of M×N crosspoint means each associated with one of said input means and one of said output means and each responsive to a token for switching information from its associated input means to its associated output means and
   N control ring means each associated with a different one of said output means for circulating a token among ones of said crosspoint means associated with that output means.

2. An arrangement in accordance with claim 1 wherein each of said crosspoint means is responsive to a token for switching information from its associated input means to its associated output means and contemporaneously passing that token on via the one of said control ring means associated with that output means.

3. An arrangement in accordance with claim 2 further comprising
   N means each associated with a different one of said output means for broadcasting, to ones of said crosspoint means associated with that output means, a busy signal defining that output means as busy.

4. An arrangement in accordance with claim 3 wherein each of said crosspoint means is responsive to a token for switching information from its associated input means to its associated output means only in an absence of a busy signal on the one of said broadcasting means associated with that output means.

5. An arrangement in accordance with claim 4
wherein each of said crosspoint means is operative in a first mode for passing received tokens on without storing them, and is operative in a second mode for storing received tokens before passing them on,
wherein each of said crosspoint means is responsive to a request signal from its associated input means defining its associated output means, for operating in said second mode, and
wherein each of said crosspoint means is responsive to storage of a token therein while operating in said second mode, for switching information from its associated input means to its associated output means.

6. An arrangement in accordance with claim 1 further comprising
N means each associated with a different one of said output means for broadcasting, to ones of said crosspoint means associated with that output means, a busy signal defining that output means as busy.

7. An arrangement in accordance with claim 6
wherein each of said crosspoint means is responsive to a token for switching information from its associated input means to its associated output means only in an absence of a busy signal on the one of said broadcasting means associated with that output means.

8. An arrangement in accordance with claim 1
wherein each of said crosspoint means is operative in a first mode for passing received tokens on without storing them, and is operative in a second mode for storing received tokens before passing them on,
wherein each of said crosspoint means is responsive to a request signal from its associated input means defining its associated output means, for operating in said second mode, and
wherein each of said crosspoint means is responsive to storage of a token therein while operating in said second mode, for switching information from its associated input means to its associated output means.

9. An arrangement for controlling sequential access to a shared resource by a plurality of users of said resource comprising
a plurality of crosspoint means each associated with a different one of said users, and
control ring means for circulating a token among said plurality of crosspoint means,
wherein each of said crosspoint means is operative in a first mode for passing received tokens on without storing them, and is operative in a second mode for storing received tokens before passing them on,
wherein each of said crosspoint means is responsive to a request signal from the one of said users associated with said each crosspoint means, for operating in said second mode, and
wherein each of said crosspoint means is responsive to storage of a token while operating in said second mode, for effecting access to said resource by the one of said users associated with said each crosspoint means.

10. A crosspoint element for switching information from an input means to an output means comprising
first means operative in a first mode for passing received tokens on to another crosspoint element without storing them, and operative in a second mode for storing received tokens before passing them on to said another crosspoint element,
second means responsive to a request signal for placing said first means in said second mode, and
third means responsive to storage of a token by said first means while operating in said second mode, for transmitting information from said input means to said output means.

11. A crosspoint element in accordance with claim 10
wherein said first means is responsive to an initiation of transmission by said third means for passing a token stored by said first means on to said another crosspoint element.

12. A crosspoint element in accordance with claim 11
wherein said second means is responsive to a termination of transmission by said third means for placing said first means in said first mode.

13. A crosspoint element in accordance with claim 10
wherein said second means is responsive to a termination of transmission by said third means for placing said first means in said first mode.

14. In a token-based arrangement, a method for resolving contention among a plurality of users in accessing a shared resource, said method comprising
(A) in response to a receipt of a token by a first one of said users, said first user accessing said resource,
(B) concurrent with step A), said first user passing said token on to a second one of said users, and
(C) in response to a receipt of said token by said second user and a termination of access by said first user, said second user accessing said resource.

* * * * *